Dec. 9, 1969   J. BAKKER ET AL   3,483,412

MECHANICAL VIBRATING SYSTEM

Filed March 6, 1967   3 Sheets-Sheet 1

3,483,412
MECHANICAL VIBRATING SYSTEM
Johannes Bakker and Joannes Hendrikus Bakker, both of Irenstraat 19, Son, Netherlands
Filed Mar. 6, 1967, Ser. No. 621,020
Claims priority, application Netherlands, Mar. 4, 1966, 6602823
Int. Cl. H02k 33/00
U.S. Cl. 310—103    6 Claims

ABSTRACT OF THE DISCLOSURE

A mechanical vibrating system useful for mechanisms where vibratory action is involved, e.g. electric razors, grass mowing machines, coal conveyors, vibrating needles for concrete. The system comprises two coaxial, relatively rotatable bodies provided with magnetic members. One body can be rotated by an external power source. On the outer periphery of the inner cylindrical body and on the cylindrical inner periphery of the outermost body there are helical magnetic members identically polarized throughout the length of the helix approximately in the axial direction of the relevant supporting bodies and having the same pitch. The non-rotated body is supported in a resilient manner such that by reacting to the co-operation between the two magnetic members it can perform a rectilinear reciprocatory movement in the axial direction.

---

The invention relates to a mechanical vibrating system comprising two coaxial, relatively rotatable bodies provided with magnetic members, one of which bodies can be caused to rotate by an external power source.

The invention has for its object to achieve by a particular form and polarization of the relatively co-operating magnetic members on the relatively rotatable bodies that, when one of the two bodies is driven, an accelerated reaction appears in the other body, whilst the losses involved in the transmission of energy are minimized.

According to the invention both the outer periphery of the innermost cylindrical body and the cylindrical inner periphery of the outermost body are provided with a helical magnetic member consisting of one or more portions, said two helical magnetic members being of identical polarity throughout the length of the helix approximately in the direction of the axis of the supporting bodies and having the same pitch, whilst the body not to be caused to rotate is not rotatable and is supported in a resilient manner so that by way of reaction to the cooperation of the two magnetic members it can perform a rectilinear reciprocatory movement in the direction of the axis. This provides a further advantage in that by using helical magnetic members, a particularly vigorous action of the vibrating system is obtained and a reserve action of the vibrated body of the system on the driving motor is avoided.

According to the invention the innermost cylindrical body may be coupled directly or through a transmission with a driving motor. For this purpose the outermost body may be arranged inside a cylindrical casing so as to be non-rotatable, but axially displaceable with respect to said casing, whilst it may be connected by the end remote from the driving end of the system by means of a ring of elastic material with the casing, said end being adapted to give off the vibratory energy produced in the outermost body.

The invention will be described more fully hereinafter with reference to the drawing, which shows inter alia two embodiments.

Figure 1:
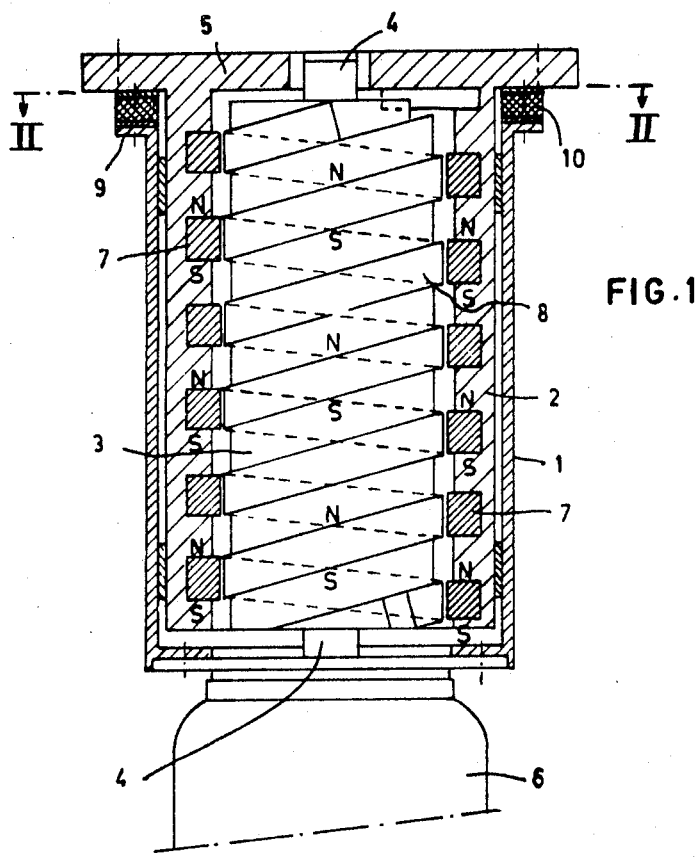
FIG. 1 is an axial sectional view of a first embodiment.
Figure 2:
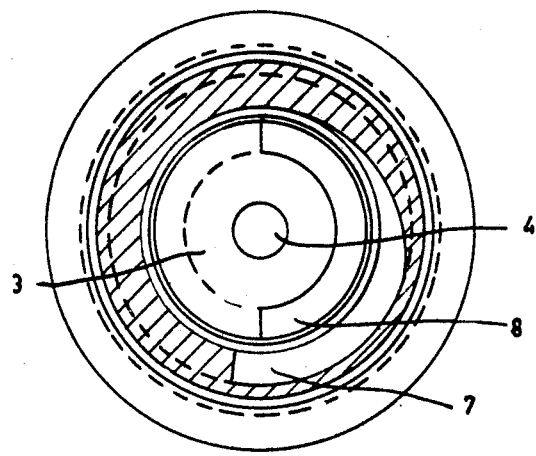
FIG. 2 is a cross sectional view on the plane II—II in FIG. 1.

In the embodiment of the vibrating system shown in FIGS. 1 and 2 a stationary housing 1 accommodates a hollow cylindrical body of non-magnetic material, which is arranged in the housing 1 so that it is non-rotatable with respect to this housing, but is displaceable in the axial direction of the cylinder. The means used for this purpose are generally known and therefore not shown in detail in the schematic drawing.

Inside the hollow cylinder 2 a solid cylinder 3 of non-magnetic material is rigidly secured to a shaft 4. At one end of the housing this shaft 4 is journalled in the central opening of an end wall 5, which closes one end of the hollow cylinder 2 and is rigidly secured thereto. The other end of the shaft 4 projects from the relevant end of the housing 1 and is rigidly coupled with the shaft of a driving electric motor 6, which is arranged in a manner not shown in the end concerned of the housing 1.

In the inner wall of the hollow cylinder 2 a helical member 7 of permanent magnetic material is arranged so that the rectangle-section turns of this helical member extend over a given distance beyond the cylindrical surface of the inner wall of the hollow cylinder 2.

The cylindrical outer surface of the body 3 is also provided with a helical member 8 of permanent magnetic material so that the rectangle-section turns of this helical member extend over a given distance beyond the surface of the cylinder 3.

The pitch of the turns of the helical member 7 is equal to that of the turns of the helical member 8 and the two helical members are wound in the same sense.

Viewed in the axial direction of the two bodies 2 and 3 the two helical permanent magnetic members 7 and 8 are identically polarized, which means that all turns of the helical member 7 on the side facing the electric motor 6 have the same polarity, for example the south pole (S), whereas the opposite side is the north pole, as is indicated in FIG. 1 by S and N. The same applies to the helical member 8 on the cylinder 3, driven by the electric motor 6. Now the operation of the embodiment described in the foregoing will be described, reference being made in the first place to the schematic FIGURE 4. This FIGure illustrates two turns of the helical magnetic member 7 in the inner wall of the hollow cylinder 2 and one turn of the helical magnetic member 8 on the outer wall of the cylinder 3. For the sake clarity the shape of the cross section of said turns differs slightly from that shown in FIG. 1.

Figure 4:
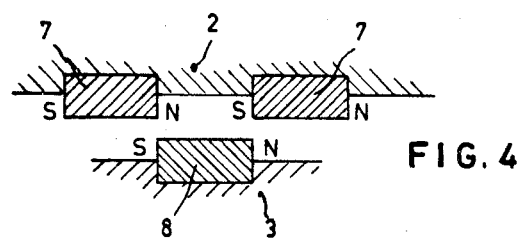
FIG. 4 shows diagrammatically the cooperation between the helical members on the two relatively rotatable bodies of the vibrating system.

If the helix of the magnetic member 8, shown in a cross sectional view, is in the position $a$ instead of occupying the position $b$ shown in FIG. 4, that is to say if it is just opposite the left-hand turn of the helical magnetic member 7 shown, when the cylinder 3 is rotated, said helices exert relatively repelling forces in the radial direction, whereas in an axial direction they do not at all act one upon the other. When upon a further rotation of the cylinder 3, the single turn of the helical magnetic member 8 shown in FIG. 4 moves from the position $a$ to the position $b$, a repelling action is produced between the south poles of the left-hand turn of the helical magnetic member 7 and the single turn of the helical magnetic member 8, whereas a force of attraction is produced between the north pole of the last-mentioned turn and the south pole of the next turn (shown on the right-hand side) of the helical magnetic member 7. This means that, since the cylinder 3 is not displaceable in the axial direction and the hollow cylinder 3 is axially displaceable, a repelling force will be exerted on the latter in the opposite sense (to the left in FIG. 4). When upon a further turn of the cylinder 3 the single turn shown of the helical magnetic member 8 has reached the position $b$, an attractive force is produced in a radial direction between said single turn of the helical magnetic member 8 and the two turns shown of the helical magnetic member 7, whilst the force exerted between these turns in the axial direction is again zero.

Upon a further turn of the cylinder 3 the single turn shown in FIG. 4 of the helical magnetic member 8 will move from the position $b$ shown to the position $c$, during which movement the south magnetic end face of the turn of the helical magnetic member 8 is subjected to an attractive force by the left-hand turn shown of the helical magnetic member 7, which force has first mainly a radical direction, like the north magnetic end face of the singal turn of the helical magnetic member 8 and the left-hand south magnetic end face of the right-hand helical magnetic member 7. As soon as the single turn shown of the helical magnetic member 8 has reached, upon a fruther turn of the cylinder 3, the position $c$, that is to say just opposite the right-hand turn of the helical magnetic member 7, the same condition is obtained as that in which the single turn shown of the helical magnetic member 8 is just opposite the left-hand turn shown of the helical magnetic member 7, which means that only in a radial direction repelling forces are operative, whereas the force exerted in an axial direction is again zero.

This effect described with reference to the schematic FIGURE 4 for two turns of the hollow cylinder 2 and one turn on the cylinder rotor 3, is considerably amplified by the presence of a great number of turns of the two helical members 7 and 8 on the rotor and the stator.

It should be noted that the cylinder 3 arranged inside the non-rotatable, axially displaceable hollow cylinder 2 is driven by the electric motor 6 in a direction unlike that in which the helical magnetic members 7 and 8 are wound, so that during its rotation the helical magnetic member 8 each time intersects the helical magnetic member 7 throughout the length, so that two opposite repelling forces are produced, which act upon the hollow cylinder 2.

By the above described construction of the vibrating system it is ensured that the rotation imparted by the electric motor 6 to the cylinder 3 can be obtained by comparatively low power, whilst the rectilinear axial movement of the hollow cylinder 2 as a reaction to the cooperation of the two helical magnetic members is accelerated.

In the vibrating system according to the invention the reciprocatory movements of the body driven by the reactive forces are not purely sinusoidal with time; this results in a non-linear movement.

By raising the speed of rotation of the body driven by the external source of power and hence the frequency of the reciprocatory movement of the body caused to vibrate by reaction the non-linear vibratory movement finally changes into a linear vibration.

If the whole vibrating arrangement is considered as a vibrating system it can be stated that a state of equilibrium prevails between the body driven by the external power, to the considered as the vibrating element, and the body caused to vibrate by the resultant reactive forces, to be considered as a damping element. The external power source imparts energy to the vibrating element, whereas the damping element withdraws energy therefrom. It is assumed that both are equal to each other. Therefore, the external power source has to be capable of compensating the loss involved in the achievement of work, and for this purpose the frequency of the vibrations has to coincide with that of the force exerted. From the foregoing it follows that the work achieved by the force for a short time is equal to the product of the force and the path covered during said time, the latter being equal to the product of the speed and the time of one full period.

Consequently, the source of power has to be capable of achieving the external work. In the systems hitherto known for vibrating arrangements, the state of equilibrium, when considered as a vibrating system, is not determined by the damping element and the vibrating element but it is determined by the damping element withdrawing energy from the system and the source of power having to accomplish the work. In other terms, the losses involved in the source of power are also determinative of the value of said state of equilibrium. If the rotary body of the vibrating system is driven by an A.C. motor, by means of which the number of revolutions and hence the frequency have to be controlled and if the damping is not constant, the losses due to alternating forces reacting upon the system are considerable, so that the amplitude is reduced by the varying power output.

Apart from said losses, resonance vibrations may occur. The latter phenomenon will now be explained more fully with reference to FIGS. 5 and 6, which illustrate the magnitude of the vibration amplitude as a function of the frequency.

Figure 5:
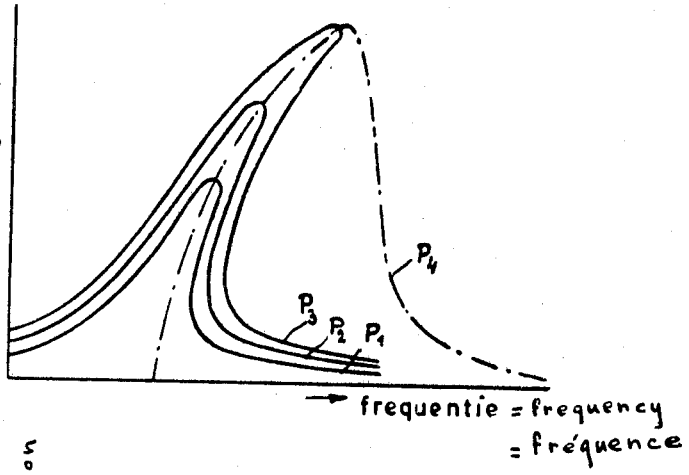
FIGS. 5 and 6 show two diagrams illustrating the resonance curves relating to the operation of the vibrating system according to the invention.
Figure 6:
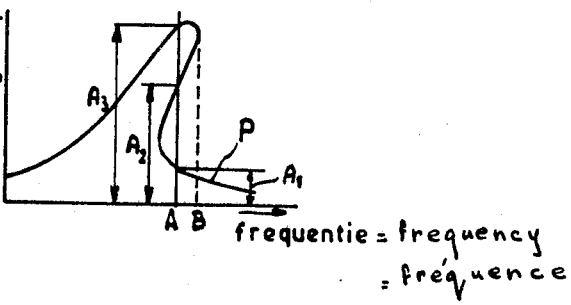

With each value of the amplitude $p$ of the alternating force exerted by the prime mover the resonance curve has a different shape. FIG. 5 shows three resonance curves $P_1$, $P_2$ and $P_3$. If the frequency of the alternating forces of the prime mover is slowly increased from zero without varying the force amplitude, the variation of the force with frequency is as is illustrated by the resonance curve $P_2$ in FIG. 5. For the sake of clarity this curve is again shown separately in FIG. 6. As soon as the frequency has exceeded the value A, the vibrating system may assume three different modes of vibration, which are designated in FIG. 6 by $A_1$, $A_2$, and $A_3$. Experience shows that the vibration amplitude continues to follow the rhythum associated with the value $A_3$ until at the frequency value B with the maximum value of the vibration amplitude this is no longer possible.

If the vibration amplitude and the associated frequency do not remain constant, an abrupt drop of amplitude appears at a given frequency, so that the so-called jump phenomena come up, in which the amplitude abruptly decreases to the value $A_1$. At a new drop of the frequency to the value A, the vibration amplitude abruptly changes over to the value $A_3$ and is then in accordance with the associated curve.

From the foregoing it will be obvious how important it is for the prime mover to transfer a constant force and for the characteristic curve indicating the relationship between the vibration amplitude and the frequency with the vibrating system under consideration to have no unstable portions. FIG. 5 illustrates a normal curve associated with the system according to the invention, the ascending branch of which is formed by the approximately sinusoidal branch of the curve $P_3$, whilst the descending branch is formed by the dot-and-dash curve $P_4$, which has a much steeper course than the ascending branch of the curve $P_3$.

Figure 3:
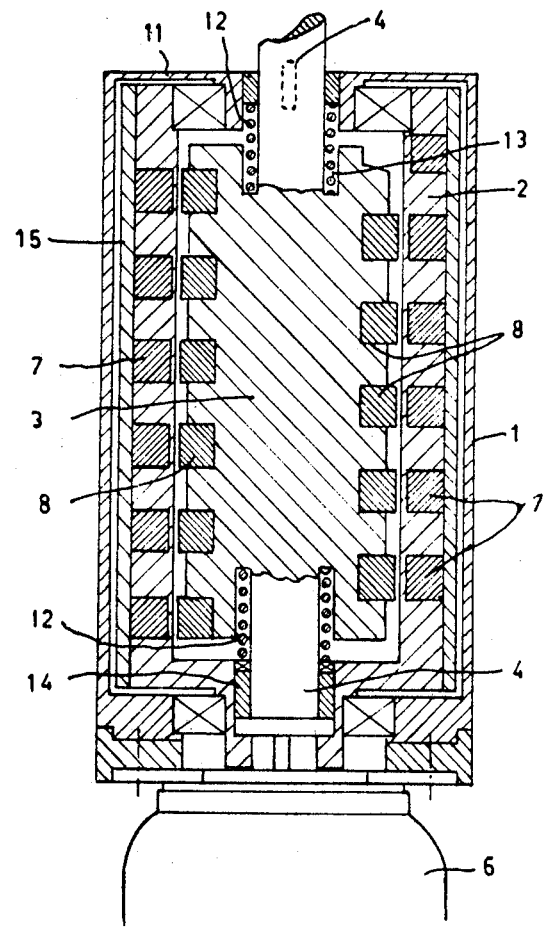
FIG. 3 is an axial sectional view of a second embodiment.

FIG. 3 is an axial sectional view of a second embodiment of the vibrating system.

The vibrating system in this embodiment differs from that shown in FIGS. 1 and 2 mainly in that the hollow cylinder 2, located inside the stationary casing 1, is driven by the electric motor 6, whereas the cylinder 3, located inside the former is not rotatable, but is axially displaceable on its shaft 4 in the end wall 11 of the casing. The vibrations in the axial direction are allowed by the helical springs 12, surrounding the ends of the shaft 4, one of which springs is located between the bearing in the end wall 11 and the bottom of an annular recess 13 in the relevant end of the cylinder 3, whereas the other spring is located between the bottom of a similar recess at the other end of the cylinder 3 and a collar 14, surrounding the relevant end of the shaft 4.

FIG. 3 shows furthermore that in this second embodiment the helical magnetic member 7 is completely countersunk in the non-magnetic material of the hollow cylinder 2, whereas this cylinder is furthermore surrounded by a closing cylinder 5, rigidly secured thereto.

It will be obvious that in details the construction of the vibrating system described above may be modified in various ways within the scope of the invention. Each helical magnetic member may be formed by a helical array of separate permanent magnetic elements, the identical poles of which are adjacent each other along the helical path.

We claim:

1. In a mechanical vibrating system comprising two coaxial, cylindrical bodies provided with magnetic members, one of which can be caused to rotated by an external power source, thereby causing the other body, which is not rotatable and is mounted for resilient movement in an axial direction, to perform a rectilinear reciprocating motion in the axial direction, the improvement wherein both the outer wall of the inner cylindrical body and the inner wall of the outer cylindrical body, are provided with helical permanent magnets consisting of one or more parts; the said helical magnets being magnetically polarized in the same sense over the entire length of the helix approximately in the axial direction of the non-magnetic supporting bodies and having the same pitch.

2. A mechanical vibrating system as claimed in claim 1, wherein the innemost cylindrical body is coupled with a driving motor.

3. A mechanical vibrating system as claimed in claim 2, wherein inside a cylindrical casing the outermost body is non-rotatable, and axially displaceable with respect to said casing, and at its end removed from the driving end of the system the body is connected by means of a ring of elastic material with said casing, said end being adapted to give off the vibratory energy produced in the outermost body.

4. A mechanical vibrating system as claimed in claim 1, wherein the outermost body is coupled with a driving motor.

5. A mechanical vibrating system as claimed in claim 4, wherein the innermost body is arranged inside a cylindrical casing so as to be non-rotatable and axially displaceable with respect to said casing and at both ends of the system, between the innermost body and the casing, there is arranged a helical spring, and at the end remote from the driving end of the system the innermost body supports a member extending in the axial direction through the casing so as to project therefrom for giving off the vibratory energy produced in the innermost body.

6. A mechanical vibrating system as claimed in claim 1, wherein said helical magnets are at least partially embedded in a non-magnetic mass and have a rectangular cross section.

References Cited

UNITED STATES PATENTS

| 2,790,095 | 4/1957 | Peek et al. | 310—103 |
| 2,915,654 | 12/1959 | Robinson | 310—14 |

FOREIGN PATENTS

| 945,225 | 12/1963 | Great Britain. | |

MILTON O. HIRSHFIELD, Primary Examiner

L. L. SMITH, Assistant Examiner

U.S. Cl. X.R.

310—14